United States Patent [19]
Dadel et al.

[11] Patent Number: 5,456,340
[45] Date of Patent: Oct. 10, 1995

[54] CONTROL FOR VEHICULAR TRANSMISSION RETARDERS

[75] Inventors: Martin R. Dadel, Plainfield; Charles F. Long, Pittsboro, both of Ind.

[73] Assignee: General Motors Corporation, Detroit, Mich.

[21] Appl. No.: 86,419

[22] Filed: Jul. 2, 1993

[51] Int. Cl.$^6$ .................................................. F16D 57/02
[52] U.S. Cl. ......................... 188/294; 188/290; 192/4 B
[58] Field of Search .................................. 188/290, 291, 188/292, 293, 294, 296; 192/4 B

[56] References Cited

U.S. PATENT DOCUMENTS

| | | | |
|---|---|---|---|
| 3,863,739 | 2/1975 | Schaefer et al. | 188/274 |
| 3,931,870 | 1/1976 | Memmer | 188/296 |
| 3,987,874 | 10/1976 | Fuehrer | 188/296 |
| 4,235,320 | 11/1980 | Polak et al. | 192/4 B |
| 4,324,320 | 4/1982 | Spurlin et al. | 188/271 |
| 5,000,300 | 3/1991 | Klemen et al. | 192/4 B |
| 5,101,941 | 4/1992 | Long et al. | 192/4 B |

*Primary Examiner*—Robert J. Oberleitner
*Assistant Examiner*—Chris Schwartz
*Attorney, Agent, or Firm*—Donald F. Scherer

[57] ABSTRACT

A retarder control embodying the concepts of the present invention utilizes a spool valve having a spool valve member axially translatable between an on- and an off-position. A spring is employed to bias the spool valve member toward its off-position. A torque converter, a cooler and a retarder each have an input and an output that are ported through the spool valve. The retarder is selectively ported to a hydraulic return through the spool valve, and a modulating solenoid may be employed to feed pressurized hydraulic fluid against the spool valve member not only to move the spool valve member against the spring toward its on-position but also to regulate the axial translation of the spool valve member in order to control the pressure at the retarder discharge that is also ported through the spool valve. A cooler communicates directly with the converter when the spool valve member is in its off-position. To the contrary, the cooler communicates directly with the retarder when the spool valve member is in the on-position. First and a second reaction sub-chambers are disposed in opposition against the spool valve member. A spring is received within the first reaction sub-chamber. A modulating solenoid effects continuous communication of pressurized hydraulic fluid to the second reaction sub-chamber when the spool valve member in its on-position, and a conduit selectively communicates pressurized hydraulic fluid to the first reaction chamber.

21 Claims, 3 Drawing Sheets

CONTROL FOR VEHICULAR TRANSMISSION RETARDERS

TECHNICAL FIELD

The present invention relates generally to vehicular transmission systems. More particularly, the present invention relates to retarders for vehicular transmission systems. Specifically, the present invention relates to an improved on/off control for a retarder in a vehicular transmission system.

BACKGROUND OF THE INVENTION

Retarders are hydrodynamic brakes that utilize relative rotation of the components within the retarder to assist in slowing the vehicle in which the retarder is employed. Retarders are sometimes located in association with the output of the transmission and sometimes they are located in conjunction with the input to the transmission. Both locations have relative advantages and disadvantages, as is well known to this art. The present invention, however, is directed to the control by which the retarder is actuated, or deactuated, and a control embodying the concepts of the present invention is not dependent upon the relationship of the retarder to the transmission input or output.

Retarders have historically been employed in large vehicles to assist in vehicle braking, or deceleration, particularly for the descent of steep hills in order to relieve the vehicle brakes from extended usage. The original retarders, or as they were then known, grade-retarding devices, were activated by moving the drive range selector lever to a "grade retarder range." In this position of the selector lever all drive clutches were released, and to the surprise of the uninitiated driver, the grade retarder position of the selector lever would not afford any forward drive to the vehicle. It was truly a retard-only position.

Over the years the application and control of the retarder became quite sophisticated. The current state of the art for retarder controls is depicted in FIG. 1 to provide for an on/off operation of the retarder. The retarder itself typically constitutes a bladed rotor wheel that is attached to the transmission, and a bladed stator that is fixedly positioned. In the vehicular art when a component is thus fixedly positioned it is said to be "grounded," or "fixed to ground." The rotor and the stator form a toroidal working chamber that is filled with hydraulic fluid to effect the hydrodynamic braking action, and from which the hydraulic fluid is emptied in order to deactuate the retarder.

The prior art retarder control system, designated generally by the numeral 10 in FIG. 1, requires multiple valves to satisfy all the current requirements for such devices. For example, line pressure is supplied from a pump 11 through a conduit 12 to a regulating valve 13 that is operated by the control pressure supplied by a modulating control valve 14 through a conduit 15 to the regulating valve 13. When the control pressure in conduit 15 is sufficient to open the regulating valve 13, line pressure is transferred through a conduit 16 to a signal valve 17. The signal valve 17 operates a flow control valve 18 to permit the passage of hydraulic fluid pressure through conduit 19 to the input port 20 of the retarder 21.

Hydraulic fluid exits the retarder 21 through a discharge port 22 into a conduit 23—which contains a temperature sensor 24—to be directed through the flow control valve 18 and into the intake port 25 of a cooler 26. The cooled hydraulic fluid leaves the cooler 26 through the discharge port 27 and is directed, through conduit 28, into the flow control valve 18 and thence into the feed conduit 19 that connects to the input port 20 of the retarder 21. Retarder operation does not require the continuous introduction of hydraulic fluid. Instead, the fluid within the retarder 21 is continuously worked between the rotating impeller and the fixed stator to dissipate the energy reflected by the rotating impeller to ground through the stator, and thus assist in slowing the vehicle. Although fluid flow through the retarder 21 is not necessary to its operation, the prior art systems generally do assure that a sufficient quantity of hydraulic fluid is available to the retarder 21 by virtue of a supplemental supply line $19_A$ connected between the regulator 13 and the flow control valve 18.

Any hydraulic fluid which leaves the converter, not shown, enters the flow control valve 18 through conduit 36, and supplements the flow of lubricating fluid through the lubrication fluid distribution system feed line 38.

An air actuated accumulator 30 is provided to satisfy the initial demand for the volume of hydraulic fluid required to fill the retarder. The accumulator is connected to the intake port 25 of the cooler 26 through conduit 39.

When the retarder 21 is not needed, the modulating solenoid 14 reduces the pressure fed through conduit 15 to the regulating valve 13. When the modulating solenoid thus reduces the pressure to the regulating valve 13 continued communication of the pressurized hydraulic fluid through line 16 to the signal valve 17 is precluded, thus permitting the biasing action of the spring 31 to translate the spool valve member 32 within the flow control valve 18 such that conduit 19, which supplies hydraulic fluid to the retarder 21, is closed. Simultaneously therewith, the conduit 23 that communicates with the discharge port 22 of the retarder 21 opens through the flow control valve 18 to the hydraulic return system 33. This same translation of the spool valve member 32 also connects the return conduit 36 from the converter to the intake port 25 of the cooler 26.

A restricted flow of hydraulic fluid, which serves to lubricate and cool the retarder 21, is fed from the cooler 26, through the flow control valve 18 and through a by-pass conduit 34 that incorporates a constriction 35 to minimize the flow of hydraulic fluid therethrough.

As should now be apparent, even the most sophisticated prior art control 10 was a complicated arrangement that required several valve members to effect the desired results.

SUMMARY OF THE INVENTION

It is, therefore, a primary object of the present invention to provide a novel retarder control device that not only combines a flow directing valve and a pressure regulating valve but also eliminates many other valves and solenoids while continuing the availability of the operational features supplied by the prior art retarder controls.

It is another object of the present invention to provide a retarder control device, as above, which obviates the necessity for utilizing an accumulator actuation solenoid.

It is a further object of the present invention to provide a retarder control, as above, that can be preset to respond to specific operational requirements.

It is still another object of the present invention to provide a retarder control, as above, that obviates excessive retarder torque capacity which might cause wheel lock or overheating.

It is yet another object of the present invention to provide a retarder control, as above, that is not only less complex than prior art controls but is also lighter in weight and which can be manufactured, installed and operated at lesser cost than known prior art arrangements.

These and other objects of the invention, as well as the advantages thereof over existing and prior art forms, which will be apparent in view of the following detailed specification, are accomplished by means hereinafter described and claimed.

In general, a retarder control embodying the concepts of the present invention utilizes a spool valve means having a spool valve member axially translatable between and on- and an off-position. A spring means is employed to bias the spool valve member toward its off-position.

A torque converter, a cooler and a retarder each have an input means and a discharge means that are ported through the spool valve means. The retarder is selectively ported to a hydraulic return means through the spool valve means, and a modulating solenoid may be employed to feed pressurized hydraulic fluid against the spool valve member not only to move the spool valve member against the spring means toward its on-position but also to regulate the axial translation of the spool valve member in order to control the pressure at the retarder discharge that is also ported through the spool valve means.

To acquaint persons skilled in the arts most closely related to the present invention, one preferred embodiment of a retarder control that illustrates a best mode now contemplated for putting the invention into practice is described herein by, and with reference to, the annexed drawings that form a part of the specification. The exemplary retarder control is described in detail without attempting to show all of the various forms and modifications in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
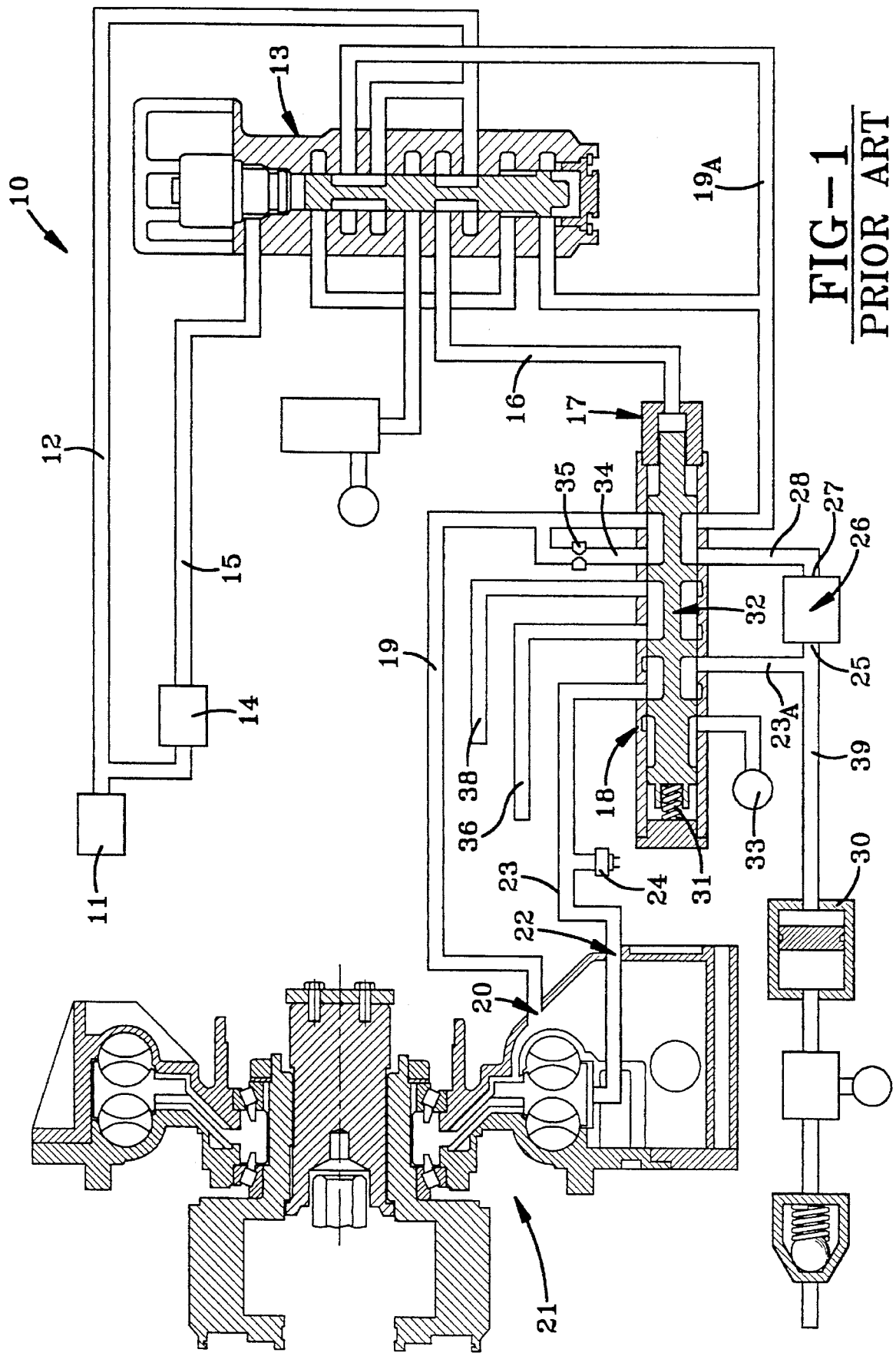
FIG. 1 is a schematic representation of a prior art control system for the retarder of a vehicular transmission.

One representative form of control system for an on/off retarder embodying the concepts of the present invention is designated generally by the numeral 100 on the accompanying drawings. The control system 100 is depicted in conjunction with a converter 101, a cooler 102, an accumulator 103, a modulating solenoid 104 and the vehicle air system 105. Perhaps the most distinctive aspect of the system 100 is the particular control valve 110 which incorporates a flow/regulator portion 111 and an accumulator actuation valve portion 112.

Figure 2:
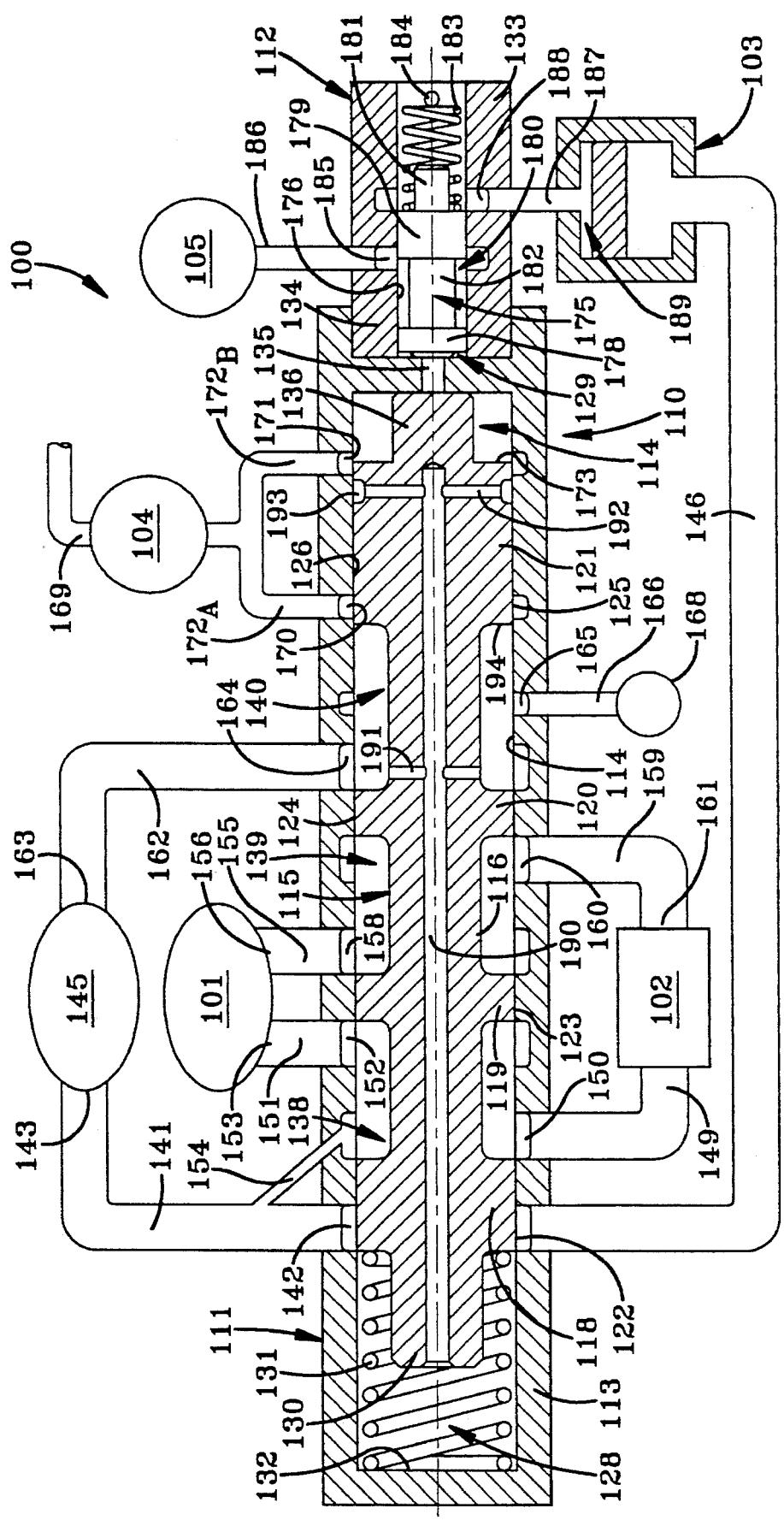
FIG. 2 is a schematic representation of an on/off control system embodying the concepts of the present invention for use in conjunction with a retarder for a vehicular transmission, the control system being depicted in the off-position; and, FIG. 3 is a schematic representation similar to FIG. 2 and depicting an on/off control system embodying the concepts of the present invention for use in conjunction with a retarder for a vehicular transmission, the control system being depicted in the on-position.
Figure 3:
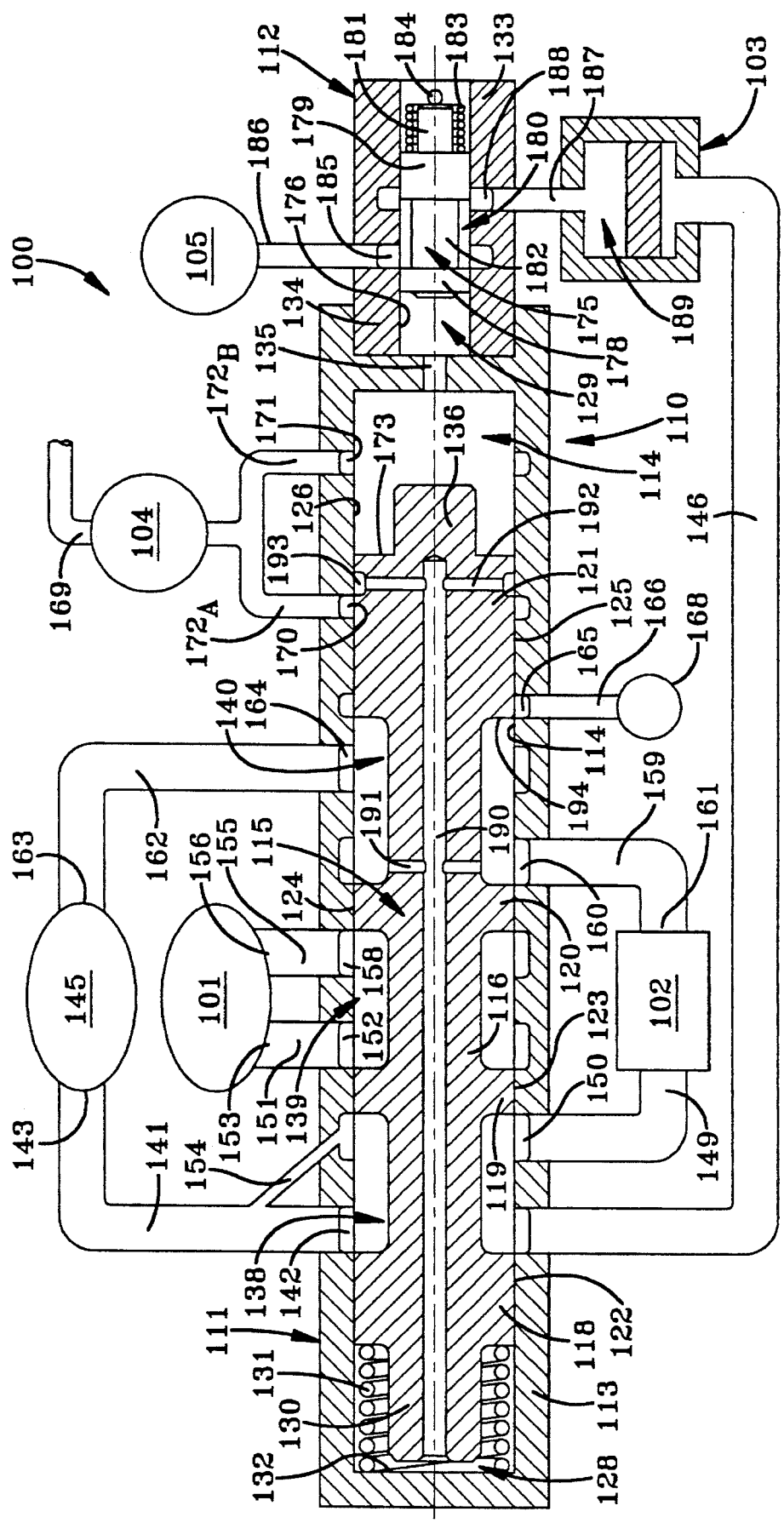

The control valve 110 may be contained within a valve housing 113 that has a cylindrical, interior chamber 114 within which a spool valve member 115 is received for reciprocating translation between an "off" position (as depicted in FIG. 2) and an "on" position (as depicted in FIG. 3.)

The control valve 110 is preferably a mechanical valve in which the spool valve member 115 is reciprocated at a predetermined increment axially along the machined valve chamber 114 within the housing 113 in order to effect selective communication between a plurality of annular ports (hereinafter individually designated) which open into the valve chamber 114 at spaced locations along the axis of the spool valve member 115.

The spool valve member 115 has a central shaft portion 116 with a plurality (four in the arrangement depicted) of lands 118, 119, 120 and 121 that extend radially outwardly from the central shaft portion 116 at spaced axial intervals therealong. When the spool valve member 115 is received within the chamber 114, the radially outer, cylindrical surface 122, 123, 124 and 125 on each of the respective lands 118 through 121 effects a sealing engagement with the interior surface 126 of the valve chamber 114. By selectively locating the ports in conjunction with the selective spacing of the lands, the recesses between successive lands form the hereinafter described sub-chambers that are utilized to effect selective communication between successive ports in response to the particular axial disposition of the spool valve member 115 within the chamber 114.

First and second reaction chambers 128 and 129 are also at each end of the valve chamber 114. The first reaction chamber 128 may be provided in the valve housing 113, and a first extension 130 of the central shaft portion 116 extends into the first reaction chamber 128. The first extension 130 may serve as locator for a compression spring 131 that circumscribes the extension and engages the end wall 132 of the first reaction chamber 128 to apply a continuous biasing force against the spool valve member 115 which urges the spool valve member 115 toward the off-position depicted in FIG. 2. The first extension 130 may also be of an appropriate dimension to engage the end wall 132 of the first reaction chamber 128 in order to serve as a locator for the spool valve member 115 when it is in the on-position depicted in FIG. 3.

The second reaction chamber 129 may also be located within the valve housing 113, or, as shown, the second reaction chamber 129 may be provided within a plug 133 that is seated in an open end 134 of the valve chamber 114. The base wall 134 of the plug 133 is penetrated by a passageway 135 that effects communication between the second reaction chamber 129 and the valve chamber 114. A second extension 136 of the central shaft portion 116 extends axially outwardly against the base wall 134 of the plug 133. Engagement of the second extension 136 with the base wall 134 of the plug 133 serves as a locator for the spool valve member 115 when it is in the off-position depicted in FIG. 2.

Engagement of the four lands 118 through 121 on the spool valve member 115 with the cylindrical valve chamber 114 delineates three distinct sub-chambers. The first, or feed, sub-chamber 138 is defined by the recess between the first and second lands 118 and 119, respectively. A second, or converter return, sub-chamber 139 is defined by the recess between the second and third lands 119 and 120, respectively. A third, or retarder return, sub-chamber 140 is defined by the recess between the third and fourth lands 120 and 121, respectively.

In the improved control system 111 a retarder feed line 141 communicates between an annular first, or retarder, feed port 142 that circumscribes the valve chamber 114 within the valve housing 113. The feed line 141 also communicates with the inlet port 143 of the retarder 145. A fluid transfer line 146 communicates between the accumulator 103 and the annular feed port 142. As such, when the control valve 110 is in the retarder off-position depicted in FIG. 2, the first land 118 permits communication between the retarder feed line 141 and the fluid transfer line 146 to be effected only through the annular port 142. This allows back flow of hydraulic fluid from the retarder 145 into the accumulator 103.

A cooler discharge line 149 communicates between the cooler 102 and an annular cooler discharge port 150 that also circumscribes the valve chamber 114 within the valve housing 113. The cooler discharge port 150 continuously communicates with the first, or feed, sub-chamber 138, irrespective of whether the spool valve member 115 is in the off-position or the on-position.

A converter feed line 151 communicates between an annular converter feed port 152 that circumscribes the valve chamber 114 within the valve housing 113 and the inlet port 153 of the converter 101. When the control valve 110 is in the retarder off-position depicted in FIG. 2, the converter feed port 152 communicates with the first, or feed, sub-chamber 138, thereby assuring a continuous flow of hydraulic fluid from the cooler 102 through the feed sub-chamber 138 and out the converter feed port 152 to the converter 101. A small portion of the cooled hydraulic fluid entering the feed sub-chamber 138 also exits through a restricted passage, or bleeder vent, 154 that communicates between the feed sub-chamber 138 and the retarder feed line 141 to assure that the retarder 145 is cooled, and lubricated, when not in use and to supplement the hydraulic fluid required to refill the accumulator 103 by back flow through the annular port 142 and the fluid transfer line 146.

A converter discharge line 155 communicates between the outlet port 156 of the converter 101 and an annular converter discharge port 158 that also circumscribes the valve chamber 114 within the valve housing 113. When the control valve 110 is in the retarder off-position depicted in FIG. 2, the converter discharge port 158 communicates with the second, or converter return, sub-chamber 139. A cooler feed line 159 communicates between an annular cooler feed port 160 that similarly circumscribes the valve chamber 114 and the inlet port 161 of the cooler 102. When the control valve 110 is in the retarder off-position depicted in FIG. 2, the cooler feed port 160 also communicates with the converter return sub-chamber 139, thereby assuring a continuous flow of hydraulic fluid from the converter 101 through the converter return sub-chamber 139 and to the inlet port 161 of the cooler 102. The hydraulic fluid thus cycles from the cooler 102 through the converter 101 and back to the cooler 102 when the control valve 115 is in the off-position.

A retarder discharge line 162 communicates between the outlet port 163 of the retarder 145 and an annular retarder discharge port 164 that also circumscribes the valve chamber 114. When the control valve 110 is in the retarder off-position depicted in FIG. 2, the retarder discharge port 164 communicates with the third, or retarder return, sub-chamber 140. An annular exhaust port 165 communicates, as by conduit 166 with a hydraulic return system 168. When the spool valve member 115 is in the off-position, as shown in FIG. 2, any fluid within the retarder 145 will continuously exhaust, through the retarder return sub-chamber 140, to hydraulic fluid return system 168.

The modulating solenoid 104, which receives pressurized hydraulic fluid, as from a supply line 169, communicates with annular first and second fluid pressure control input ports 170 and 171 through a bifurcated feed line $172_A$ and $172_B$ to supply modulated control pressure to the spool valve member 115, as will be hereinafter more fully explained. The annular input ports 170 and 171 circumscribe the valve chamber 114 in axially spaced relation—the input port 170, which communicates with feed line $172_A$, being blocked by the fourth land 121 when the control valve 100 is in the off-position. Simultaneously, the input port 171, which communicates with feed line $172_B$, continuously communicates with the valve chamber 114 that is exposed to the end surface 173 of land 121 and secondarily communicates with the second reaction chamber 129 through the passageway 135 that penetrates the base wall 134 of the plug 133.

The accumulator actuation valve 112 utilizes a two land, spool valve member 175 that is axially translatable within the cylindrical surface 176 of the second reaction chamber 129. The axially spaced lands 178 and 179 delineate a transfer chamber 180 therebetween, and an axial extension 181 on the end of the shaft portion 182 serves as a guide for the compression spring 183 that extends between the second land 179 and a cross pin 184. An annular, pressurized-air entry port 185 communicates with the transfer chamber 180, and a conduit 186 communicates between the vehicular air system 105 and the annular entry port 185—and thereby the transfer chamber 180. An annular air distribution port 188, which circumscribes the cylindrical surface 176 of the second reaction chamber 129, communicates with atmosphere in close proximity to the second land 179 on the accumulator spool valve member 175 when the control valve 110 is in the off-position. The annular air distribution port 188, in turn, communicates through passage 187 with an air chamber 189 within the accumulator 103.

It should also be noted that an axial bore 190 penetrates a substantial extent of the central shaft portion 116. The axial bore 190 opens through the first extension 130 of the central shaft portion 116 to communicate with the first reaction chamber 128. A radially extending first bore 191 continuously communicates between the axial bore 190 and the retarder return sub-chamber 140. A radially extending second bore 192 continuously communicates between the axial bore 190 and an annular recess 193 provided in the outer, cylindrical surface 125 of the fourth land 121.

Operation

To this point the description has centered about the off-position of the control valve 110, but when the retarder is to be actuated, an appropriate signal is sent to the modulating solenoid 104 in order to initiate translation of the spool valve member 115 to the on-position. The desired translation of the spool valve member 115 is initiated when the modulating solenoid 104 applies hydraulic fluid under an increased pressure to the bifurcated feed lines 172. The fourth land 121 blocks the control input port 170, but the pressurized hydraulic fluid is introduced through port 171 into valve chamber 114. The increased pressure within the valve chamber acts against the end surface 173 of the fourth land 121 to overcome the biasing action of compression spring 131 to translate the spool valve member 115 to the on-position depicted in FIG. 3. At the same time, the increased pressure within the valve chamber 114 is reflected by a concomitant increase in the pressure within the second reaction chamber 129. The increased pressure within the second reaction chamber 129 translates the accumulator spool valve member 175 against the biasing action of compression spring 183, thereby effecting communication between the transfer chamber 180 and the air chamber 189 within the accumulator 103. This increased pressure in the air chamber 189 force the hydraulic fluid within the accumulator 103 to pass through the fluid transfer line 146 and the control valve 110 to fill the retarder 145 virtually instantly. As is understood in the prior art, the retarder can only function when it is filled with fluid, and the fluid applied by the accumulator 103 allows the retarder 145 to function immediately.

When the spool valve member 115 of the control valve 110 is coaxially translated to the on-position, both annular ports 142 and 150 will open to the feed sub-chamber 138, thereby assuring unimpeded communication of the cooler discharge line 149 to the retarder feed line 141 so that the initial fluid forced into the retarder 145 from the accumulator 103 will be constantly replenished by cooled fluid emanating from the cooler 102. This flow is augmented by the fact that when the spool valve member 115 is in the on-position the retarder discharge line 162 will primarily communicate through the retarder return sub-chamber 140 with the cooler feed line 159. The converter return sub-chamber 139 will be positioned to recycle any flow exiting the converter 101 through converter discharge line 155 into the converter return sub-chamber 139 and immediately back into the converter feed line 151.

A control valve 110 embodying the concepts of the present invention will also effectively monitor and control the pressure of the hydraulic fluid discharged from the retarder 145 by way of the discharge line 162, which is ported through the valve 110 as previously described. This result is accomplished by selecting the strength of the compression spring 131 in relation to the pressure applied to the valve chamber 114 by the modulating solenoid 104 through bifurcated feed line $172_B$. As the pressure applied against the inboard face 194 of the fourth land 121 which forms one end wall of the retarder return sub-chamber 140 exceeds the differential pressure applied to the spool valve member 115 by the spring 131 in opposition to the pressure applied against the end surface 173 of the fourth land 121, the spool valve member 115 will be modestly translated to permit excess pressure to be relieved through the exhaust port 165 and into the hydraulic fluid return system 168. Conversely, should the pressure within the retarder return sub-chamber 140 be reduced to the point where the pressure within the valve chamber 114 exceeds the biasing force applied by the spring 131, the pressurized fluid supplied by the modulating solenoid 104 will be directed into the annular recess 193 and through the second radial bore 192 to flow along the axial bore 190 and enter the first reaction chamber 128. The pressurized fluid thus admitted into the first reaction chamber 128 will augment the action of the spring 131 and translate the spool valve member 115 against the fluid pressure within the chamber 114 until the pressure within the retarder return sub-chamber, as supplemented by the pressure applied through the first radial bore 191, is sufficient to translate the spool valve member 115 and thereby once again open the retarder return sub-chamber 140 to the hydraulic fluid return system 168 through the exhaust port 165. The hydraulic fluid entering the retarder return sub-chamber 140 through the radial bore 191 also supplements the hydraulic fluid available to enter the retarder 145 through the cooler 102.

When the control valve 110 is in the off-position the pressure within air chamber 189 is equal to atmospheric pressure so that the back flow from the retarder 145 through the retarder feed line 141 and the fluid transfer line 146, as assisted by the modest pressure applied through the restricted passage, or bleeder vent 154, will serve to recharge the accumulator 103.

While only a preferred embodiment of my present invention is disclosed, it is to be clearly understood that the same is susceptible to numerous changes apparent to one skilled in the art. Therefore, the.scope of the present invention is not to be limited to the details shown and described but is intended to include all changes and modifications which come within the scope of the appended claims.

As should now be apparent, the present invention not only teaches that a control embodying the concepts of the present invention not only combines the flow directing valve and pressure regulating valve, while eliminating many other valves and solenoids, but also accomplishes the other objects of the invention.

We claim:

1. A retarder control system comprising:

a spool valve means having a spool valve member axially translatable between an on- and an off-position;

spring means having a preselected compression strength to bias said spool valve member toward said off-position;

a torque converter, a cooler and a retarder, each having an input means and a discharge means ported through said spool valve means;

said retarder selectively ported to a hydraulic return means through said spool valve means;

a modulating solenoid to feed pressurized hydraulic fluid against said spool valve member not only to move said spool valve member against said spring means toward said on-position but also to regulate the axial translation of said spool valve member in order to control the pressure at the retarder discharge ported through said spool valve means.

2. A retarder control system, as set forth in claim 1, wherein:

said compression strength of said spring means determines the maximum pressure at said retarder discharge means.

3. A retarder control system, as set forth in claim 1, wherein said spool valve member further comprises:

a plurality of radially extending lands which define first, second, and third sub-chambers therebetween as well as a valve chamber at one end of said spool valve member, a first reaction chamber at the opposite end of said spool valve member, and a second reaction chamber adjacent to and in selective communication with said valve chamber.

4. A retarder control system, as set forth in claim 3, wherein:

an annular recess circumscribing one of said plurality of radially extending lands;

an axial bore extending within said spool valve member to open into said first reaction chamber;

a first radial bore effecting communication between said axial bore and said third sub-chamber; and, a second radial bore within said spool valve member effecting communication between said axial bore and said annular recess.

5. A retarder control system, as set forth in claim 4, wherein:
said modulating solenoid valve continuously communicates with said valve chamber; and,
said hydraulic return means selectively communicates with said third sub-chamber such that a relatively low pressure within said third sub-chamber allows a relatively elevated pressure in said valve chamber to overcome said spring bias in order to effect axial translation of said spool valve member from said off-position to said on-position.

6. A retarder control system, as set forth in claim 5, wherein:
said modulating solenoid valve selectively communicates with said second radial bore by way of said annular recess to admit pressurized fluid into said first reaction chamber in order to assist said spring means in overcoming the fluid pressure exerted on said spool valve member by the pressurized fluid within said valve chamber and thereby translate said spool member toward said off-position.

7. A retarder control system, as set forth in claim 6, wherein:
relatively high pressure in said third sub-chamber assists said spring means in overcoming the pressure within said valve chamber whereby said spool valve member is translated toward its off-position.

8. A retarder control system, as set forth in claim 5, wherein:
said third sub-chamber selectively communicates with said hydraulic return means in order to relieve the pressure of any fluid within said third sub-chamber.

9. A retarder control system, as set forth in claim 1, wherein:
said cooler communicates directly with said converter when said spool valve member is in said off-position.

10. A retarder control system, as set forth in claim 9, further comprising:
a bleeder vent establishing fluid communication between said cooler and said retarder input means when said spool valve member is in its off-position.

11. A retarder control system, as set forth in claim 10, wherein:
said cooler communicates directly with said retarder when said spool valve member is in the on-position.

12. A retarder control system, as set forth in claim 11, further comprising:
a first and a second reaction chamber disposed at opposite ends of said spool valve member;
said spring means received within said first reaction chamber;
said modulating solenoid effecting continuous communication of pressurized hydraulic fluid to said second reaction chamber when said spool valve member is in the on-position; and,
conduit means selectively to communicate pressurized hydraulic fluid to said first reaction chamber.

13. A retarder control system, as set forth in claim 12, wherein:
said conduit means selectively communicates pressurized hydraulic fluid to said cooler input means when said retarder discharge means is communicating with said cooler input means.

14. A retarder control system, as set forth in claim 13, further comprising:
an accumulator;
an accumulator actuating valve member communicating with said second reaction chamber;
means to transmit pressurized hydraulic fluid from said accumulator to said retarder input means when said spool valve member is in the on-position.

15. A retarder control system comprising:
a housing having first and second axially aligned valve chambers;
said first chamber having a cylindrical wall;
a spool valve member received within said first valve chamber for reciprocating movement between a retarder-on and a retarder-off position;
said spool valve member having a central shaft portion;
a first land extending radially outwardly from said central shaft portion slidably to engage said. cylindrical wall of said first valve chamber;
a second land spaced axially from said first land and extending radially outwardly from said central shaft portion slidably to engage said cylindrical wall of said first valve chamber;
a first sub-chamber defined between said first and second axially spaced lands;
a retarder feed port selectively communicating with said first sub-chamber;
a cooler discharge port continuously communicating with said first sub-chamber;
a converter feed port selectively communicating with said first sub-chamber;
an accumulator discharge port selectively communicating with said first sub-chamber;
a third land spaced axially from said second land and extending radially outwardly from said central shaft portion slidably to engage said cylindrical wall of said first valve chamber;
a second sub-chamber defined between said second and third axially spaced lands;
said converter teed port selectively communicating with said second sub-chamber;
a converter discharge port continuously communicating with said second sub-chamber;
a cooler feed port selectively communicating with said second sub-chamber;
a fourth land spaced axially from said third land and extending radially outwardly from said central shaft portion slidably to engage said cylindrical wall of said first valve chamber;
a third sub-chamber defined between said third and fourth axially spaced lands;
said cooler feed port selectively communicating with said third sub-chamber;
a retarder discharge port continuously communicating with said third sub-chamber;
a fluid return passage selectively communicating with said third sub-chamber;
first and second reaction chambers provided in said housing;
said first land having an end face exposed to said first reaction chamber;
said fourth land having an end face exposed to said second reaction chamber;

spring means received within said first reaction chamber to bias said spool valve member to said retarder-off position;

an axial bore penetrating said central shaft portion to communicate with said first reaction chamber;

a first radial bore continuously communicating between said axial bore and said third sub-chamber;

an annular recess circumscribing said fourth land;

a second radial bore communicating between said axial bore and said annular recess in said fourth land;

a modulating solenoid presenting pressurized fluid selectively to said annular recess and said second reaction chamber; and, an accumulator actuating valve member received within said second valve chamber;

said accumulator actuating valve member communicating with said second reaction chamber.

16. A retarder control system comprising:

a spool valve means having a spool valve member axially translatable between an on- and an off-position;

said spool valve member having a plurality of radially extending lands which define first, second and third sub-chambers therebetween as well as a valve chamber at one end of said spool valve member;

a first reaction chamber at the opposite end of said spool valve member;

a second reaction chamber adjacent to and in selective communication with said valve chamber;

an annular recess circumscribing one of said plurality of radially extending lands;

an axial bore extending within said spool valve member to open into said first reaction chamber;

a first radial bore effecting communication between said axial bore and said third sub-chamber;

a second radial bore within said spool valve member effecting communication between said axial bore and said annular recess;

spring means having a preselected compression strength to bias said spool valve member toward said off-position;

a torque converter, a cooler and a retarder each having an input means and a discharge means ported through said spool valve means;

said retarder selectively ported to a hydraulic return means through said spool valve means; and, a modulating solenoid to feed pressurized hydraulic fluid against said spool valve member not only to move said spool valve member against said spring means toward said on-position but also to regulate the axial translation of said spool valve member in order to control the pressure at the retarder discharge ported through said spool valve means.

17. A retarder control system comprising:

a spool valve means having a spool valve member axially translatable between an on- and an off-position;

a first and a second reaction chamber disposed at opposite ends of said spool valve member;

spring means having a preselected compression strength to bias said spool valve member toward said off-position, said spring means received within said first reaction chamber;

a torque converter, a cooler and a retarder, each having an input means and a discharge means ported through said spool valve means;

said retarder selectively ported to a hydraulic return means through said spool valve means;

a modulating solenoid to feed pressurized hydraulic fluid against said spool valve member not only to move said spool valve member against said spring means toward said on-position but also to regulate the axial translation of said spool valve member in order to control the pressure at the retarder discharge ported through said spool valve means;

said modulating solenoid effecting a continuous communication of pressurized hydraulic fluid to said second reaction chamber when said spool valve member is in the on-position;

conduit means selectively to communicate pressurized hydraulic fluid to said first reaction chamber;

an accumulator;

an accumulator actuating valve member communicating with said second reaction chamber; and, means to transmit pressurized hydraulic fluid from said accumulator to said retarder input means when said spool valve member is in said on-position.

18. A retarder control system, as set forth in claim 17, wherein:

said cooler communicates directly with said converter when said spool valve member is in said off-position.

19. A retarder control system, as set forth in claim 18, further comprising:

a bleeder vent establishing fluid communication between said cooler and said retarder input means when said spool valve member is in said off-position.

20. A retarder control system, as set forth in claim 19, wherein:

said cooler communicates directly with said retarder when said spool valve member is in said on-position.

21. A retarder control system, as set forth in claim 20, wherein:

said conduit means selectively communicates pressurized hydraulic fluid to said cooler input means when said retarder discharge means is communicating with said cooler input means.

* * * * *